Figure 1:
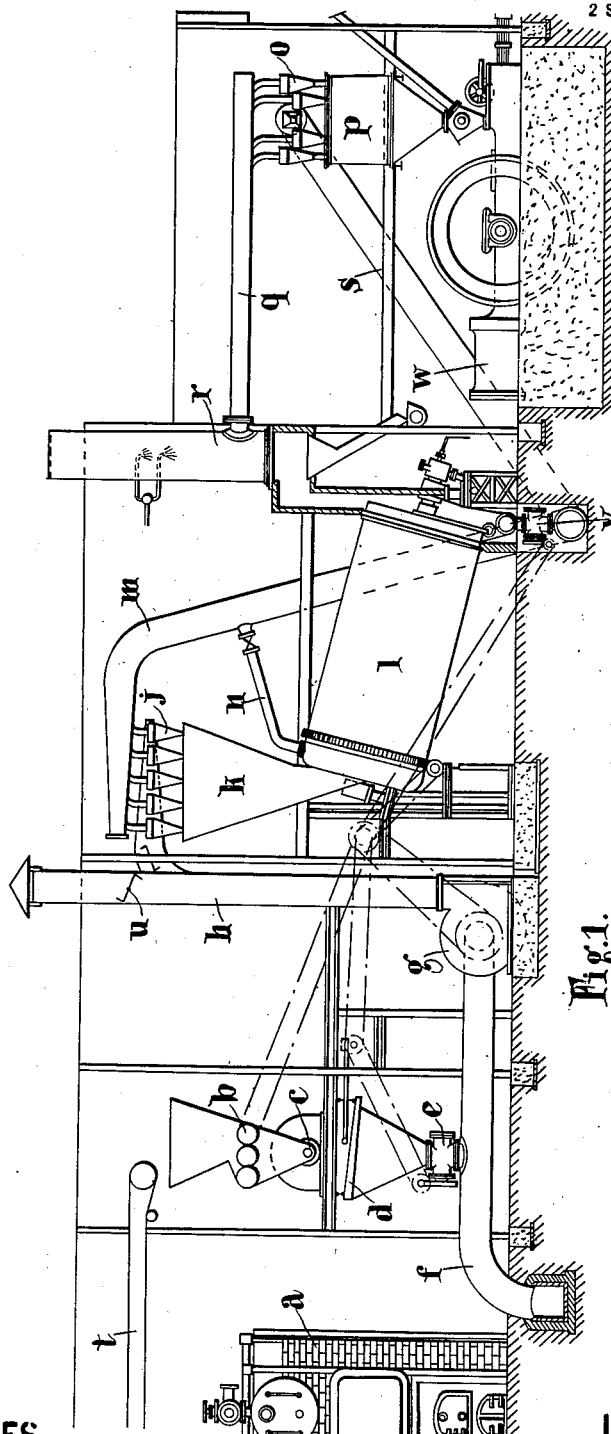

T. RIGBY.
TREATMENT OF LIGNITE AND THE LIKE.
APPLICATION FILED JAN. 11, 1913.

1,219,155.

Patented Mar. 13, 1917.
2 SHEETS—SHEET 1.

WITNESSES
W. C. Baker
A. H. Davis

INVENTOR
Thomas Rigby
BY
ATTORNEY

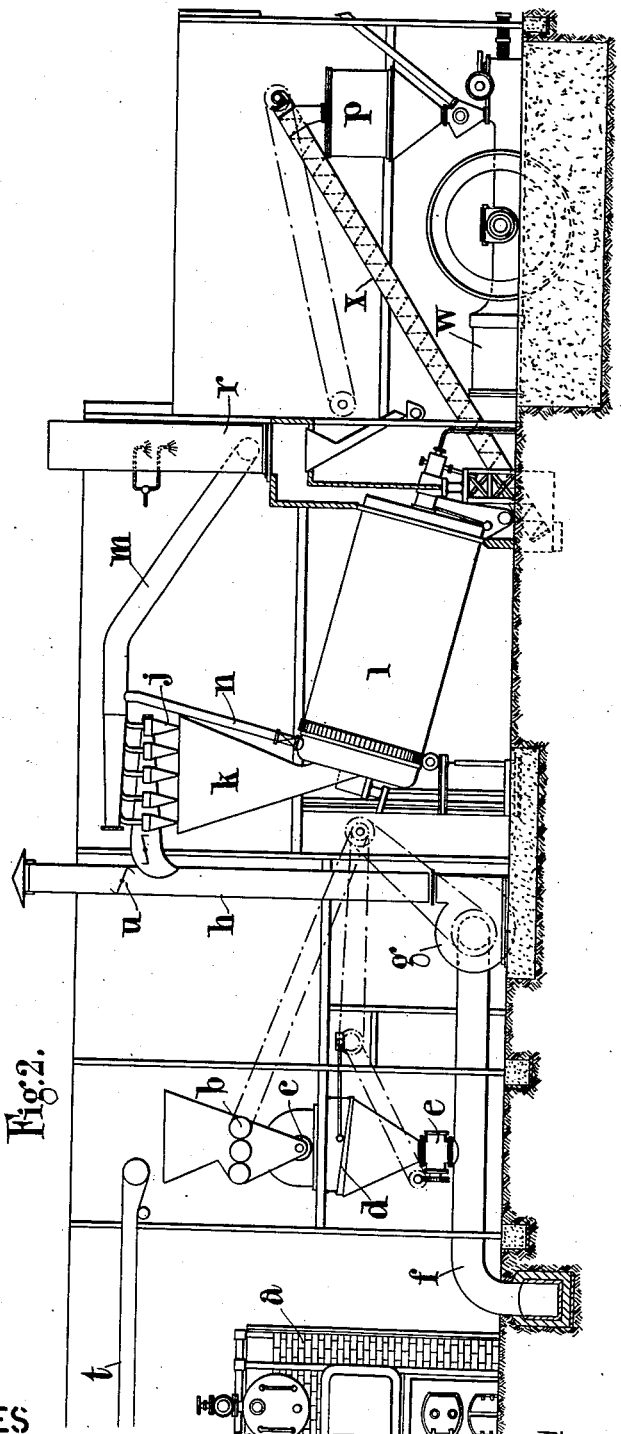

UNITED STATES PATENT OFFICE.

THOMAS RIGBY, OF DUMFRIES, SCOTLAND, ASSIGNOR OF ONE-HALF TO NILS TESTRUP, OF LONDON, ENGLAND.

TREATMENT OF LIGNITE AND THE LIKE.

1,219,155. Specification of Letters Patent. Patented Mar. 13, 1917.

Application filed January 11, 1913. Serial No. 741,583.

*To all whom it may concern:*

Be it known that I, THOMAS RIGBY, a subject of the King of Great Britain and Ireland, and residing at 61 Loreburn street, Dumfries, Scotland, have invented certain new and useful Improvements in and Relating to the Treatment of Lignite and the like, of which the following is a specification.

This invention relates to the treatment of lignite and the like and has for its object to provide an improved method for the treatment thereof applicable more particularly in the drying of the same preparatory to conversion into briquet fuel. In the conversion of lignite into briquet fuel it is customary to supply the same to Schulze or other driers and to dry the same down to a relatively small water content after which it is supplied to the briqueting presses.

The present invention consists broadly in effecting removal of moisture from lignite or the like by pulverizing the material and introducing it into a stream of hot products of combustion by which it is dried to a certain extent and conveyed to the desired locality such as to Schulze driers in which the material is then further dried.

The accompanying diagrammatic drawings show two forms of apparatus by which the invention may be carried into effect.

In Figure 1, $t$ is a conveyer band conducting moist lignite to a disintegrator $b$ from which the material passes into a mill $c$, through a shaking sieve $d$ and into a distributing device $e$ by which the powdered material is introduced in regular quantities into a rapidly flowing stream of hot waste products of combustion passing through the flue $f$ from the boiler furnace $a$ of the installation of which the briqueting plant forms part. The material is carried with this stream of gases, passes the fan $g$ and enters the vertical flue $h$ the valve $u$ of which is under these circumstances closed. The gases and suspended powder pass by the side branch flue to a set of cyclone separating devices $j$, the separated powder entering the hopper $k$ of a steam heated Schulze drier $l$ comprising a rotating shell occupying an inclined position and containing a number of tubes through which the material gradually passes from one end to the other during the rotation of the apparatus while it is heated by steam admitted to the space between the tubes and the casing and the gases then passing by the flue $m$, provided with the branch $n$, to the exit end of the Schulze drier where the more completely dried powder is once more and after passing through a double clapper device (not shown) by a distributing device $v$ introduced into the stream of gases and carried thereby through the duct $s$ to the second series of separators $o$ above the bunker $p$ which is in connection with the briqueting press $w$. The gases now leave by the duct $q$ and together with the exit gases from the drier enter the tower $r$ wherein the gases are scrubbed to recover the residual dust not separated by the cyclones.

It is to be understood that in order to obtain flue gases at a suitable temperature it is necessary to burn an excess of fuel in the furnace $a$ but this is beneficial as increasing the heat transmission and therefore evaporative capacity without corresponding heat loss in the system. A small quantity of the gases in the flue $m$, which still contain say 4% of dust and are under pressure, is passed through the pipe $n$ to replace the air usually passed through the driers.

As the hottest gases meet, at the distributer $e$, the wettest material and contain, as has been observed, an insufficient amount of oxygen with relation to inert gases ($CO_2$ for instance) to support combustion and as the preferred temperature for the gases in the duct $m$ which are to meet the driest dust is about 75° C. (above the dew point) and the gases contain a substantial amount of moisture it will be seen that the atmosphere in contact with the material throughout is such as to insure safety from ignition or explosion.

In practice it has been observed that if the temperature of the gases in the duct be maintained at above dew point and if their velocity exceed about 50 feet per second there is no tendency to stoppage in the ducts. It is preferable to keep up a very slight pressure in the duct.

If it is desired to avoid conveying the dried dust in a current of gases as above described, the above installation may be modified as shown in Fig. 2, the installation shown in this figure differing only from that already shown in that a screw conveyer $x$ in a closed duct replaces the duct $s$ and separators $o$, the duct $m$ being in this case directly connected to the scrubbing tower $r$. In this case the gases entering $r$ from $m$ tend to pass downward and fill all the spaces with inert gases but special provision may be easily made for passing inert gases into the conveyer and avoiding any possibility of ignition.

The drying effected by the flue gases can be varied by varying the length of the duct between the point of introduction and separation of the powder.

Where the drying gases are, as described above, obtained from a boiler furnace or from some other source from which the temperature may vary considerably the effect of such variations may be reduced by providing in the flue or duct $f$ a mass of iron so that it may take up a considerable quantity of heat and act as thermal storage. Although other material than iron, such as brickwork, can be employed the former is preferable as more rapid in taking up and giving out heat.

By adopting the method above described economy of fuel and plant is effected while the direct contact of the drying medium and the material to be dried favors in that step rapid and efficient heat transmission. The fact that by such a process the dust reaching the drier can be caused to contain 40% or less of moisture as against a water content of 55% or thereabout according to present practice, insures as stated a material saving in steam consumption and allows of reducing if desired, the size of the plant (driers and boilers), or on the other hand, of increasing its output and, again, allows of reducing the cost of new installations.

Having now described my invention, what I claim as new and desire to secure by Letters Patent is:—

1. A method of drying inflammable solids such as lignite consisting in pulverizing the solid and then causing the resulting powder to be suspended in waste products of combustion until dried to the desired extent.

2. A method of drying lignite consisting in reducing the lignite to a homogeneous powder and causing the powder to float in a rapidly flowing current of hot flue gases until dried to the desired extent.

3. In drying finely divided materials by causing the latter to float in a hot gaseous medium, the method of drying powdered lignite consisting in dispersing it in a current of hot flue gases moving at a velocity of about 50 feet per second or over until dried to the desired extent.

4. A method of drying lignite consisting in reducing the lignite to a homogeneous powder, causing said powder to float in a current of hot products of combustion, separating the powder from said products and further drying the powder out of the contact with a drying medium.

5. A method of drying lignite consisting in reducing the lignite to a homogeneous powder, causing said powder to float in a current of hot products of combustion, separating the powder from said products and utilizing the separated products of combustion to convey dried powder to be consolidated.

In testimony whereof I have signed my name to this specification in the presence of two subscribing witnesses.

THOMAS RIGBY.

Witnesses:
PUTNAM H. MATTHEWS,
JAMES HENDERSON.